W. F. McMONEGAL.
SHOVEL TOOTH.
APPLICATION FILED NOV. 4, 1918.
1,384,701.
Patented July 12, 1921.
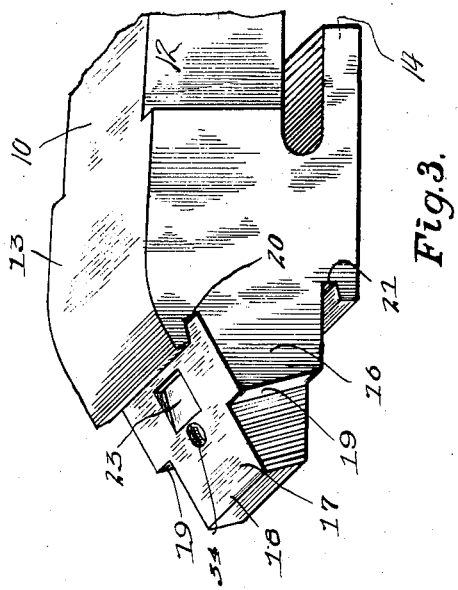
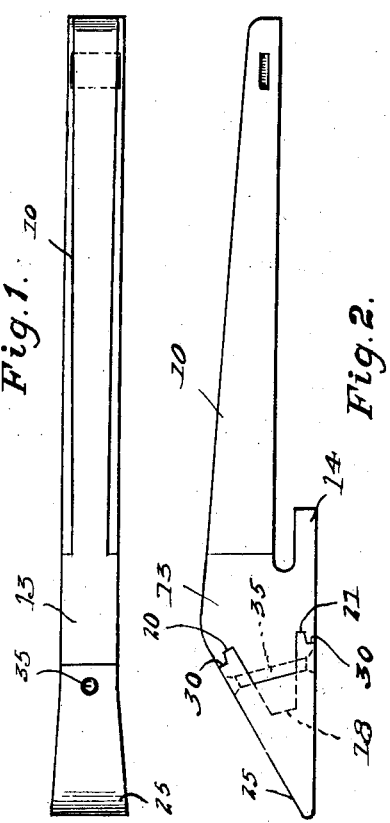
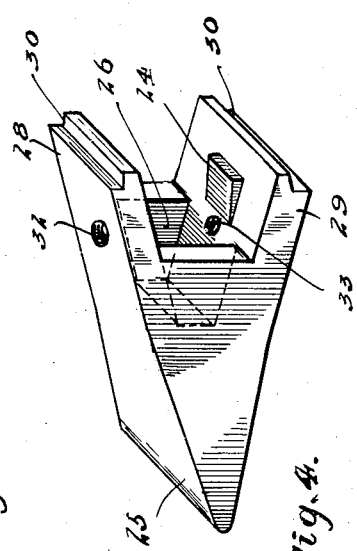
Inventor:
William F. McMonegal
By Victor J. Evans
Attorney

UNITED STATES PATENT OFFICE.

WILLIAM F. McMONEGAL, OF HAZLETON, PENNSYLVANIA.

SHOVEL-TOOTH.

1,384,701.　　　　Specification of Letters Patent.　　Patented July 12, 1921.

Application filed November 4, 1918. Serial No. 261,142.

*To all whom it may concern:*

Be it known that I, WILLIAM F. McMonegal, citizen of the United States, residing at Hazleton, in the county of Luzerne and State of Pennsylvania, have invented new and useful Improvements in Shovel-Teeth, of which the following is a specification.

This invention relates to a shovel tooth, and more particularly to a tooth designed for use on an excavating shovel.

The objects of the invention include the provision of a shank including a head constituting a solid body to be interposed between the edge of the shovel and the reversible tooth, and especially between said shovel edge and the interlocking joint connecting the shank and tooth, whereby reinforcement is provided at the point of greatest strain.

With the foregoing and other objects in view, the invention consists in the novel combination and arrangement of elements hereinafter described and claimed.

In the drawings,

Figure 1 is a top plan view of one of the teeth, with the shank therefor.

Fig. 2 shows one of the teeth in side elevation, mounted on the shank,

Fig. 3 is a perspective view of the end of the shank, and Fig. 4 is a perspective view of the tooth, detached.

In addition to the features above pointed out in connection with this invention, one of the advantages is that the elements are so arranged that the spaces between them diverge toward the rear end, or toward the front sheet of the dipper proper, thereby making it impossible for stones and other objects to become wedged between the teeth.

In carrying out my invention, I provide a shank portion 10 having tapered sides 12 and having a somewhat enlarged end portion 13. The lower portion of each member 13 projects rearwardly and in parallel relation to the body of the shank, this projecting portion being designated 14.

The forward portion of the shank is of wedge-like formation and is designated 16, the extreme end portion being shown at 17 and having a blunt wall 18 for engagement with a correspondingly formed recess in the detachable and reversible point. The member 17 is of somewhat less cross section than the portion designated 16, the connecting walls being shown at 19.

The head 13 is channeled transversely at 20 and 21 providing overhanging portions, or more correctly an upper overhanging portion and a lower corresponding projecting portion. A recess 23 is provided in the upper surface of element 16, and in the lower surface thereof a similar recess is formed, these recesses being engaged by lugs 24 formed on the detachable point.

The point is designated 25, and is of wedge-like formation, being provided with a recess 26 having straight or plane walls corresponding to the similarly formed and similarly located walls of the wedge members carried by the shank portion. Divergent projecting elements 28 and 29 are chamfered as shown at 30 and engage the channeled portions 20, 21 of the shank. The upper and lower sides of the tooth are similarly formed, the tooth being reversible in every sense, so that it is self-sharpening, and the life of the tooth is preserved to a maximum extent by simply reversing the point and continuing its use in a reversed position.

The tooth is provided with apertures 32, 33, and the shank is provided with an aperture 34 through which a pin 35 passes for the purpose of rigidly connecting the elements.

It will therefore be observed that I have provided a plurality of engaging and interlocking elements whereby movement of the tooth either laterally or vertically is absolutely prevented. The interlocking engagement between the members formed by the members 20, 21 and the chamfered portions 30 is especially important.

The enlarged head 13 provides a heavy supporting element between the edge of the shovel and the interlocking portions of the tooth.

What is claimed is:—

In a device of the class described, a shank portion provided with an enlarged head constituting a solid body to be interposed between the edge of the shovel and a tooth, the shank including a wedge-shaped projecting element, said head also having projecting elements extending transversely thereof at the base of the wedge and spaced from the tapered walls of the wedge, and a detachable and reversible tooth having a recessed portion therein and having projecting elements diverging with reference to each other and located on opposite sides of the recess, the ends of the projecting elements being chamfered, and the chamfered portions coöperating with the projecting elements at the base of the wedge and shank portions, the wedge shaped element of the shank and the projecting elements of the tooth constituting an interlocking joint beyond the aforesaid solid body of the head.

In testimony whereof I affix my signature.

WILLIAM F. McMONEGAL.